W. P. OGDEN, DEC'D.
M. E. HOLMES, ADMINISTRATRIX.
CONCENTRATOR.
APPLICATION FILED JAN. 15, 1919.

1,428,392.

Patented Sept. 5, 1922.
12 SHEETS—SHEET 1.

Fig. 1.

Maude E. Holmes, Adm'r
estate of William P. Ogden, Dec'd
INVENTOR.

BY
L. L. Westfall
ATTORNEYS.

W. P. OGDEN, DEC'D.
M. E. HOLMES, ADMINISTRATRIX.
CONCENTRATOR.
APPLICATION FILED JAN. 15, 1919.

1,428,392.

Patented Sept. 5, 1922.
12 SHEETS—SHEET 6.

INVENTOR.
ATTORNEYS.

W. P. OGDEN, DEC'D.
M. E. HOLMES, ADMINISTRATRIX.
CONCENTRATOR.
APPLICATION FILED JAN. 15, 1919.

INVENTOR.
ATTORNEYS.

W. P. OGDEN, DEC'D.
M. E. HOLMES, ADMINISTRATRIX.
CONCENTRATOR.
APPLICATION FILED JAN. 15, 1919.

1,428,392.

Patented Sept. 5, 1922.
12 SHEETS—SHEET 10.

INVENTOR.

BY *L. L. Westfall*
ATTORNEYS.

W. P. OGDEN, DEC'D.
M. E. HOLMES, ADMINISTRATRIX.
CONCENTRATOR.
APPLICATION FILED JAN. 15, 1919.

1,428,392.

Patented Sept. 5, 1922.
12 SHEETS—SHEET 12.

INVENTOR

BY
ATTORNEY

Patented Sept. 5, 1922.

1,428,392

UNITED STATES PATENT OFFICE.

WILLIAM P. OGDEN, DECEASED, LATE OF DENVER, COLORADO, BY MAUDE E. HOLMES, ADMINISTRATRIX, OF SPOKANE, WASHINGTON, ASSIGNOR TO J. M. SCHNATTERLY, OF SPOKANE, WASHINGTON.

CONCENTRATOR.

Application filed January 15, 1919. Serial No. 271,316.

*To all whom it may concern:*

Be it known that the undersigned, MAUDE E. HOLMES, a citizen of the United States of America, residing at Spokane, in the county of Spokane and State of Washington, is the administratrix of the estate of WILLIAM P. OGDEN, deceased; that the said WILLIAM P. OGDEN was a resident of Denver, of the county of Denver and State of Colorado; that he is now deceased; and that during his lifetime he invented new and useful Improvements in Concentrators, of which the following is a specification.

This invention pertains to concentrating and reduction plants and has for its object to combine into one general construction carefully worked out and demonstrated mechanism whereby placers containing coarse and fine gold, black sand, platinum and rubies may be separated and concentrated by the hydraulic process and the assistance of gravity without the use of mercury or other amalgam, whereby the free gold and platinum are prepared for the mint, the black sand for the smelter and the rubies separated for commercial purposes. This process has already been and now is being used for the above purposes in one complete plant. The same may be altered to concentrate tailings from a crushing or grinding plant and treat placer containing any one or any combination of the properties above named. The same process may be used for separating the valuable minerals from quartz where the same is ground or crushed so that the properties will separate.

There are many phases of the construction that cannot well be especially referred to in a preliminary statement but, generally speaking, the construction and process consists generally in providing a sufficient head of water, means for conveying the placer or other material to the water, providing a flume into which the placer or other material and the water is turned, the providing of grizzlies part way up the flume and along the same, of different dimensions, whereby a current of water runs along, under and over the grizzlies, such grizzlies being of different sizes and spaced adjoining each along the flume and at different distances from the floor of the flume, the elevation of the floor being adjusted to meet the variations in the required distances between the grizzlies and the floor in accordance with the size of the grizzlies and their location in the flume. To provide means for taking from the flume for separate treatment the materials containing the black sand, fine gold, platinum or other valuable mineral, the same being passed through the smaller grizzlies and carrying the material containing the coarse gold, platinum and rubies farther along the flume where it is passed through larger grizzlies and taken from the flume for separate treatment; to provide means for separating the gray sand from the black sand and said other finer grained mineral values, to separate said black sand from the finer grained values and to finally clean said finer grained values for the mint and to store the black sand for smelter treatment. To provide means for separating the coarser particles of minerals from the rubies and to separate the different grades of rubies for commercial purposes, and finally disposing of the tailings.

The detailed construction and operation of the parts will be hereinafter described and illustrated in the accompanying drawings of a plant constructed along the general lines mentioned, in which a double flume is used and in which.

Figure 35, is a broken-away top plan view of the table.

Figure 1:
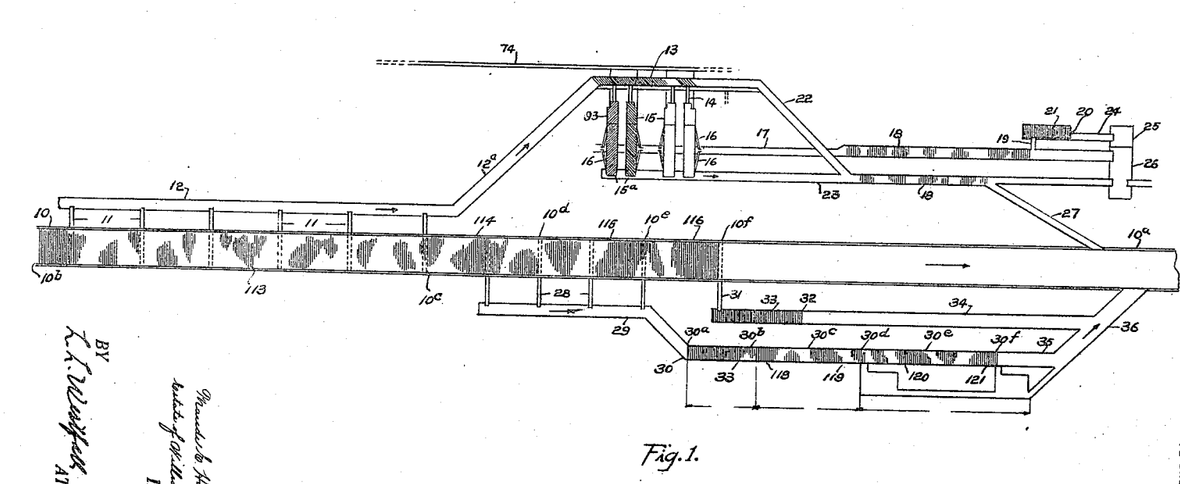
Figure 1, is a diagrammatic view of a plant for general reference purposes to show the relative positions of the different elements entering generally into the construction and to which reference will generally be hereafter had.
Figure 2:
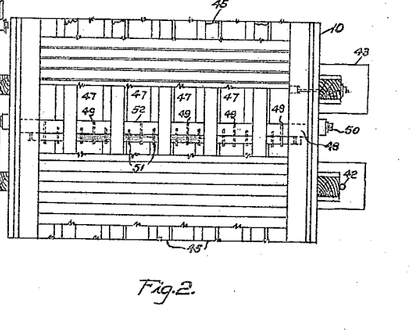
Figure 2, is a broken-away sectional plan view of the larger flume showing the draw-off gates open.
Figure 3:
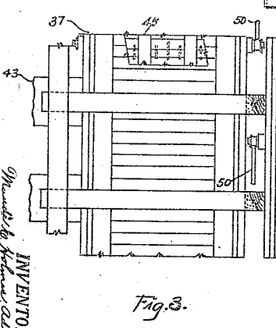
Figure 3, of the smaller flume, showing the draw-off gates closed.
Figure 4:
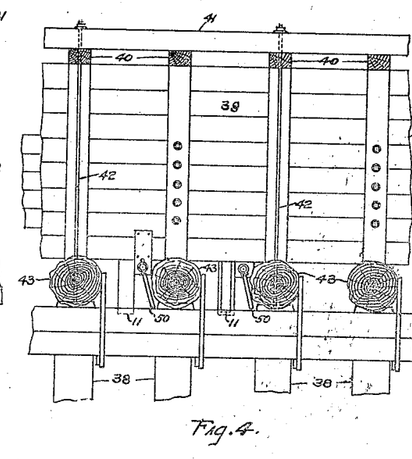
Figure 4, is a broken-away side elevation of the flume.
Figure 5:
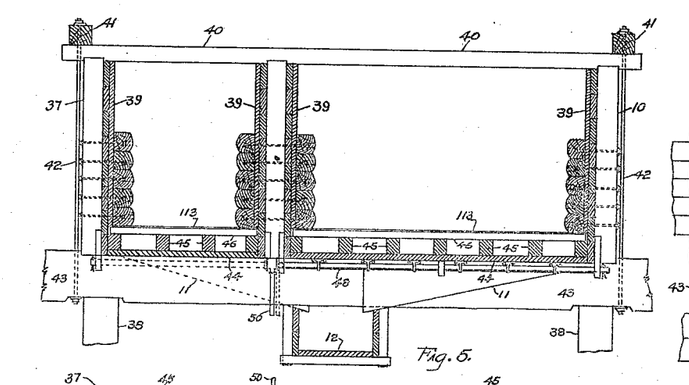
Figure 5, is a cross-section of the two flumes together, with a subjacent flume for carrying the materials drawn off through gates in the bottoms of the flumes for further treatment.
Figure 6:
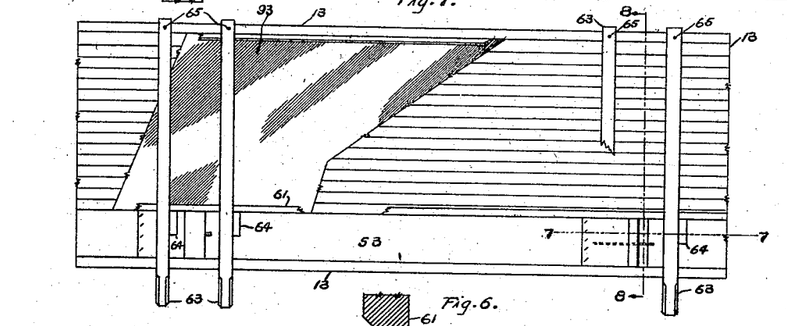
Figure 6, is a broken-away plan view of a separator and distributing flume used in the treatment of the finer particles of minerals and the black sand.
Figure 7:
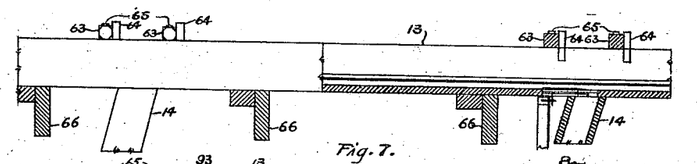
Figure 7, is a sectional view taken on the line 7—7 of Figure 6.
Figure 8:
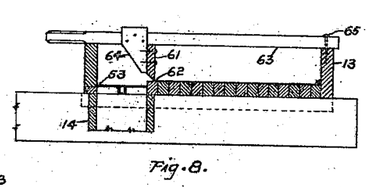
Figure 8, is a sectional view taken on the line 8—8 of Figure 6.
Figures 9, 11:
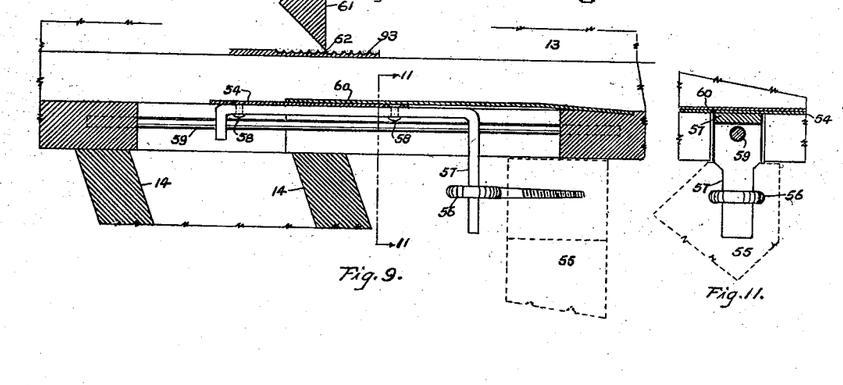
Figure 9, is a sectional view taken on the line 9—9 of Figure 6.
Figure 11, is a sectional view taken on the line 11—11 of Figure 9.
Figure 10:
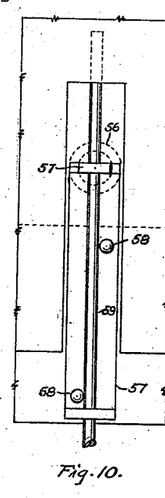
Figure 10, is a broken-away bottom view of Figure 9, illustrating the construction of the gate guide.
Figures 25, 26:
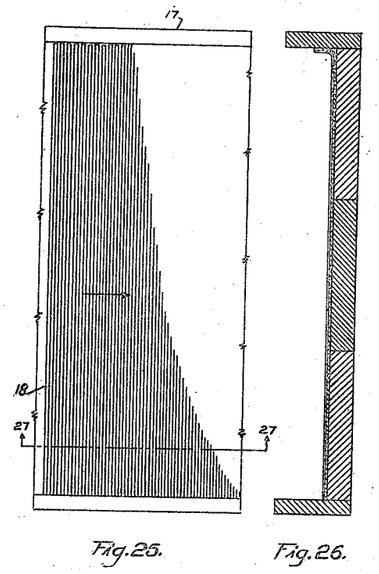
Figure 25, is a broken-away plan view of a separator table used for separating fine and flake gold from black sand.
Figure 26, is a projected end view of the same.
Figure 27:
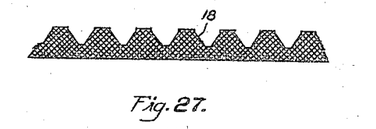
Figure 27, is a sectional view taken on the line 27—27 of Figure 25.
Figure 28:
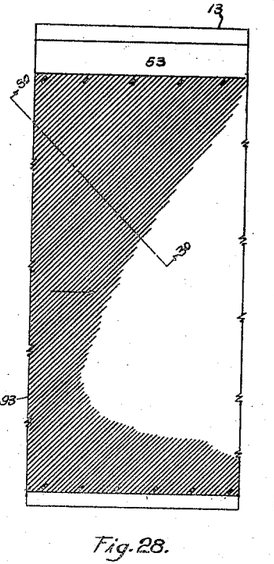
Figure 28, is a broken-away plan view of the final cleanup table of the fine and flake gold.
Figure 29:
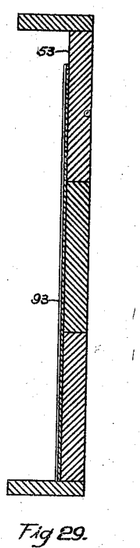
Figure 29, is a projected end view of the same.
Figure 30:
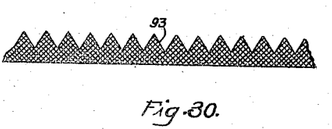
Figure 30, is a sectional view taken on the line 30—30 of Figure 28.
Figure 36:
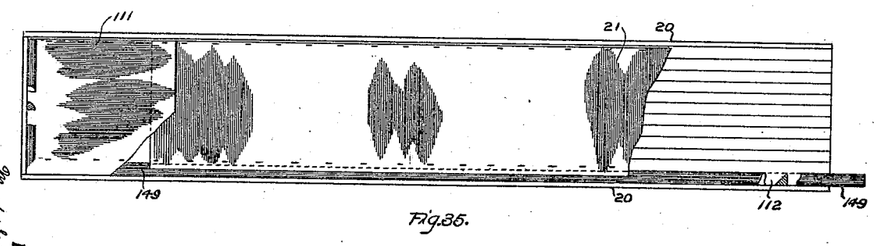
Figure 36, is a plan view of a Hungarian riffle used to take up and hold all of the coarse gold and the rubies.
Figure 37:
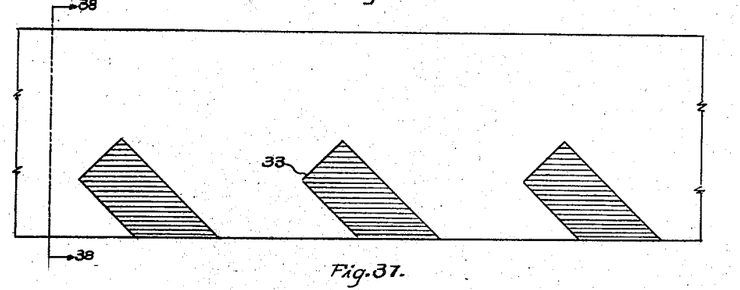
Figure 37, is an enlarged longitudinal sectional view of the same.
Figure 38:
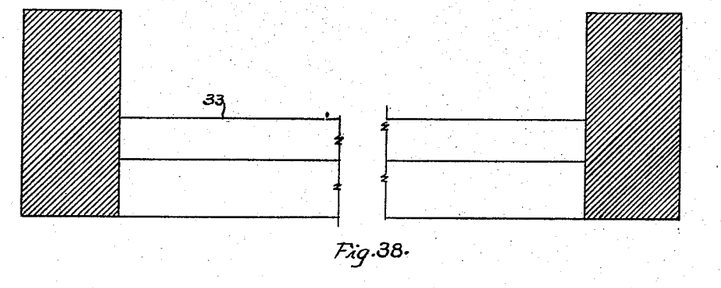
Figure 38, is a broken-away cross-sectional view of the same.
Figure 39:
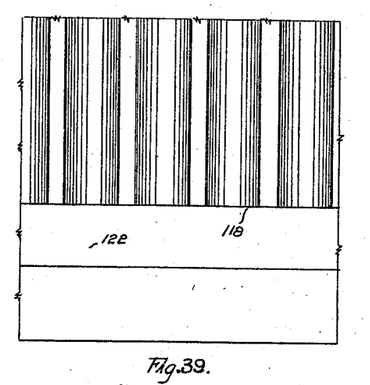
Figure 39, is a plan view of a broken-away portion of larger riffles for catching coarse gold.
Figure 40:
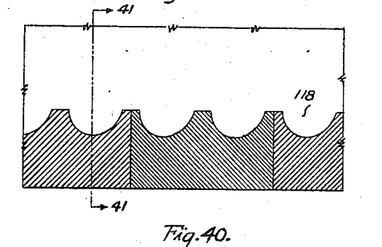
Figure 40, is a longitudinal sectional view of the same.
Figure 41:
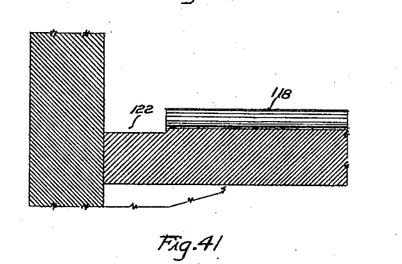
Figure 41, is a cross-sectional view taken on the line 41—41 of Figure 40.
Figure 42:
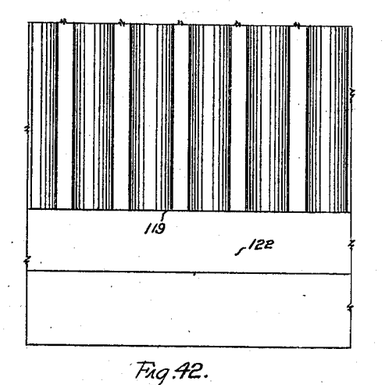
Figure 42, is a plan view of a riffle for catching coarse gold of somewhat smaller dimensions than that disclosed by Figures 39 to 41 inclusive.
Figure 43:
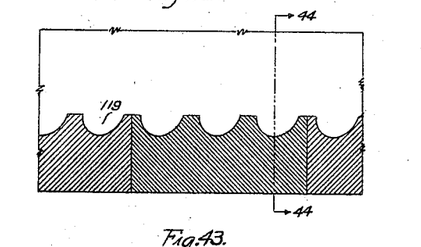
Figure 43, is a longitudinal sectional view of the same.
Figure 44:
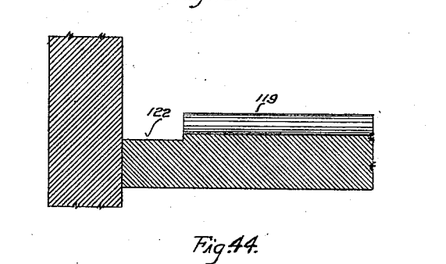
Figure 44, is a cross-sectional view taken on the line 44—44 of Figure 43.
Figure 45:
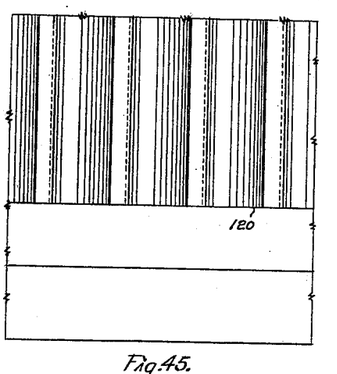
Figure 45, is a broken-away plan view of a riffle for catching the large rubies.
Figure 46:
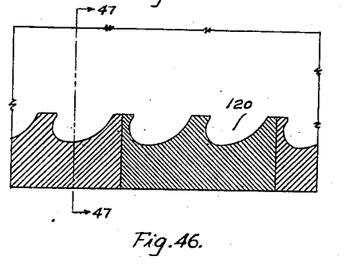
Figure 46, is a longitudinal sectional view of the same.
Figure 47:
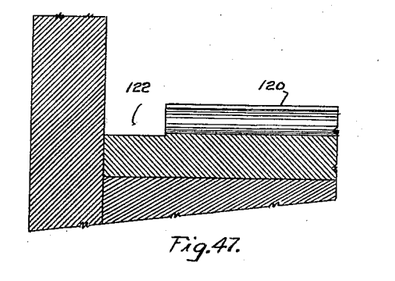
Figure 47, is a cross-sectional view of the same taken on the line 47—47 of Figure 46.
Figure 48:
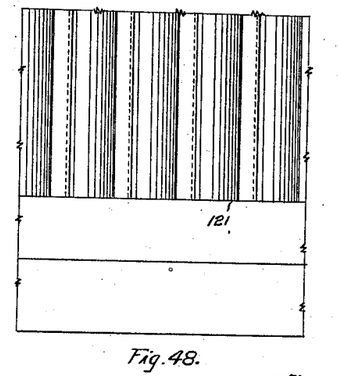
Figure 48, is a broken-away plan view of a riffle for catching the smaller rubies.
Figure 49:
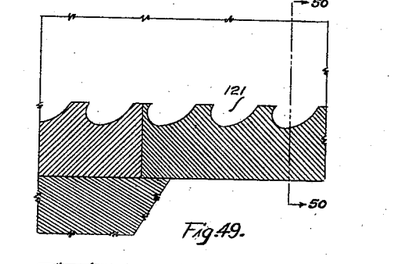
Figure 49, is a longitudinal sectional view of the same.
Figure 50:
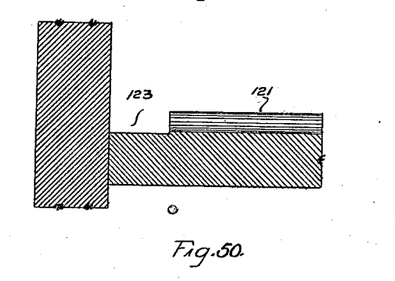
Figure 50, is a cross-sectional view taken on the line 50—50 of Figure 49.
Figure 51:
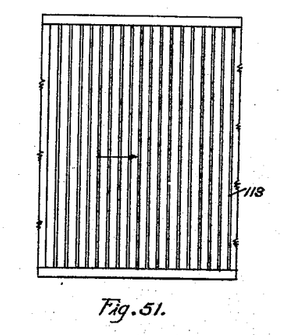
Figure 51, is a broken-away plan view of a $\frac{1}{16}$ inch grizzly over which the placer or concentrates pass.
Figure 52:
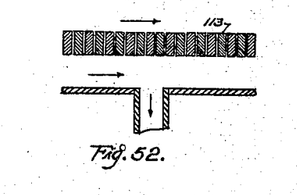
Figure 52, is a longitudinal sectional view of the same.
Figure 53:
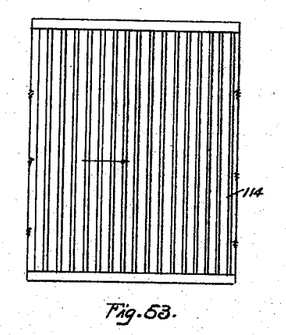
Figure 53, is a broken-away plan view of a $\frac{1}{2}$ inch grizzly over which the placer or concentrates pass after being treated by the $\frac{1}{16}$ inch grizzly.
Figure 54:
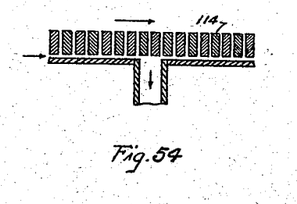
Figure 54, is a longitudinal sectional view of the same.
Figure 55:
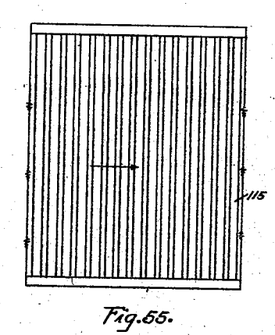
Figure 55, is a broken-away plan view of a one inch grizzly over which the placer or concentrates pass after being treated by the $\frac{1}{16}$ and $\frac{1}{2}$ grizzlies.
Figure 56:
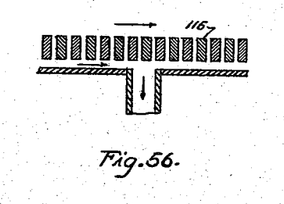
Figure 56, is a longitudinal sectional view of the same.
Figure 57:
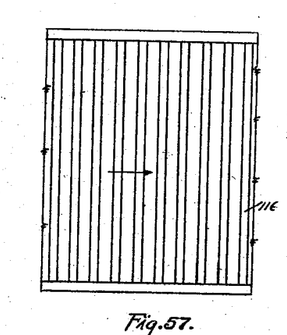
Figure 57, is a broken-away plan view of a three inch grizzly over which the placer or concentrates pass after being treated by the $\frac{1}{16}$, $\frac{1}{2}$ and one inch grizzlies.
Figure 58:
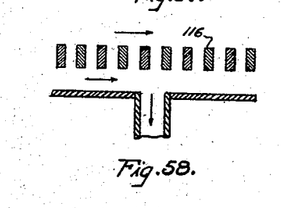
Figure 58, is a longitudinal sectional view of the same.
Figure 59:
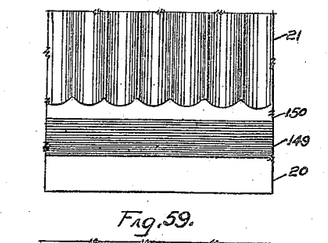
Figure 59, is a broken-away plan view of the riffles of the final cleanup table.
Figure 60:
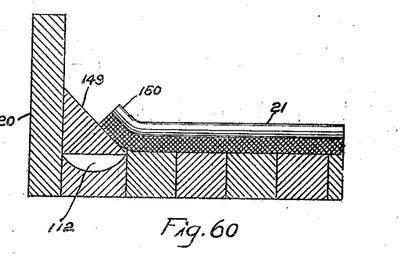
Figure 60, is a projected end view of the same.
Figure 61:
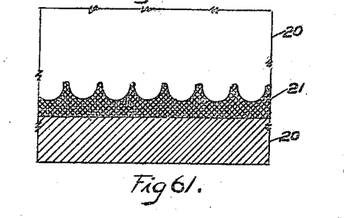
Figure 61, is a longitudinal sectional view of the same.

In a detail description in which like numerals refer to like parts throughout the several views, attention is first called to Figure 1, the same being a diagrammatic view and upon which will be indicated the relative locations of the different elements entering into the construction and which are shown in detail upon other figures. The main flume is indicated by 10 and the flow of the water and material is in the direction of the arrows marked therein. Drawoffs 11 leading from the bottom of the flume 10 connect with a conveyor 12 leading to a separator flume 13, broken-away views of which are shown in Figures 6, 7, 8, 9, 10 and 11, and baffles of which are shown in Figures 28, 29 and 30, from the bottom of which are drawoffs 14 leading to concentrating tables 15, views of which are shown in Figures 15 to 21 inclusive, and baffles in Figures 28, 29 and 30, from which are drawoffs 16 leading to a flume 17 in which is installed riffles 18 shown in Figures 25, 26 and 27. In the flume at the lower end of the baffles 18 is a drawoff 19 leading to final cleanup table 20, carrying baffles 21 which are shown in Figures 59, 60 and 61. Connected with the separator flume 13 is a conveyer flume 22 leading to a launder flume 23 which is also adapted to receive the over-flow from the concentrating tables 15. Connected with the final cleanup table 21 is a conveyer flume 24 leading to a bin 25. The flumes 17 and 23 connect with a bin 26. Leading from the flume 17 is a conveyer flume 27 connecting with the tail $10^a$ of the main flume 10. From point $10^b$ to $10^c$ in the main flume 10 are installed the $\frac{1}{16}$ inch grizzlies, broken-away views of which are shown in Figures 51 and 52. From point $10^c$ to $10^d$ in the main flume are installed the $\frac{1}{2}$ inch grizzlies, broken-away views of which are shown in Figures 53 and 54. From point $10^d$ to $10^e$ in the main flume 10 are installed one inch grizzlies, broken-away views of which are shown in Figures 55 and 56. From point $10^e$ to $10^f$ in the main flume 10 are installed 3 inch grizzlies, broken-away views of which are shown in Figures 57 and 58. From the bottom of the flume 10 at the location of the $\frac{1}{2}$ inch and one inch grizzlies are drawoffs 28 leading to a conveyer flume 29 leading to a table 30 on which are installed fine sets of baffles, spaced in the following order. From point $30^a$ to $30^b$ is installed Hungarian riffles, shown in Figures 36, 37 and 38. From point $30^b$ to $30^c$ is installed gold riffles shown in Figures 39, 40 and 41. From point $30^c$ to $30^d$ is installed gold riffles shown in Figures 42, 43 and 44. From point $30^d$ to $30^e$ is installed ruby riffles shown in Figures 45, 46 and 47. From point $30^e$ to $30^f$ is installed ruby riffles shown in Figures 48, 49 and 50. From the bottom of the main flume 10 where the three inch grizzlies are installed is a drawoff 31 leading to a table 32 on which is installed Hungarian riffles 33 shown in Figures 36, 37 and 38. A conveyer flume 34 leads from the table 32 and a conveyer flume 35 from the table 30, each connected with a flume 36 leading to the tail $10^a$ of the main flume 10.

Reference will now be had to Figures 2, 3, 4 and 5 wherein is detailed and enlarged the construction of the main flume 10. While in the diagrammatic view (Figure 1) only one flume is indicated, yet in practice it has been found advisable to have two flumes, one of larger dimensions than the other, so that when the water supply is great the larger flume can be used and when the supply of water is limited, the smaller flume can be used. The views above referred to show two flumes, the larger one 10 and a smaller one 37. The two flumes are shown paralleling each other and mounted on the same supports 38, the side walls 39 being bound together at the top by cross-girders, 40. Longitudinal guides 41 follow the outside walls 39 on top of the cross-girders 40 and rods 42 connect the same with base supports 43. The floor 44 of the flumes is surmounted by longitudinal girders 45 upon which are mounted transversely of the flumes, timbers 46, spaced apart to form grizzlies. Spaced along the flumes 10 and 37 and horizontal therewith are separate gates 47 between the girders 45. These gates are slidably adjusted by the rotation of a rod or pipe 48 to which they are secured by means of cables 49, the rod or pipe 48 being manually rotated by means of a lever 50 attached thereto. The gates 47 are supported by horizontally arranged guides 51. The gates 47 connect with the draw-offs 11 which lead to the flume 12. A plate 52 covers the connection of the gates with the floor of the flume. The flume 12 connects with the separator flume 13.

Reference will now be had to Figures 6 to 14 inclusive, wherein the separator flume and concentrating tables are shown. At one side of the separator flume 13 is a channel 53 extending longitudinal thereof. It is from this channel that the drawoffs 14 lead that reach the concentrating tables 15. These draw-offs are controlled by gates 54 manually operated by means of levers 55, the lever 55 connecting by screw eyes 56 with arms 57 secured to the gates 54 as by rivets 58. The arms 58 operate on guides 59 in order to make the gates 54 more true to line. Caps 60 cover the connections between the gates 54 and the floor of the channel 53. Spreader boards 61 reduced to a feather edge 62 are secured to arms 63 by means of blocks 64. The arms 63 are pivoted at one end only, as at 65, so that the other end thereof, which carries the spreader board 61 can be adjusted. The flume 13 is mounted on supports 66.

Figure 12:
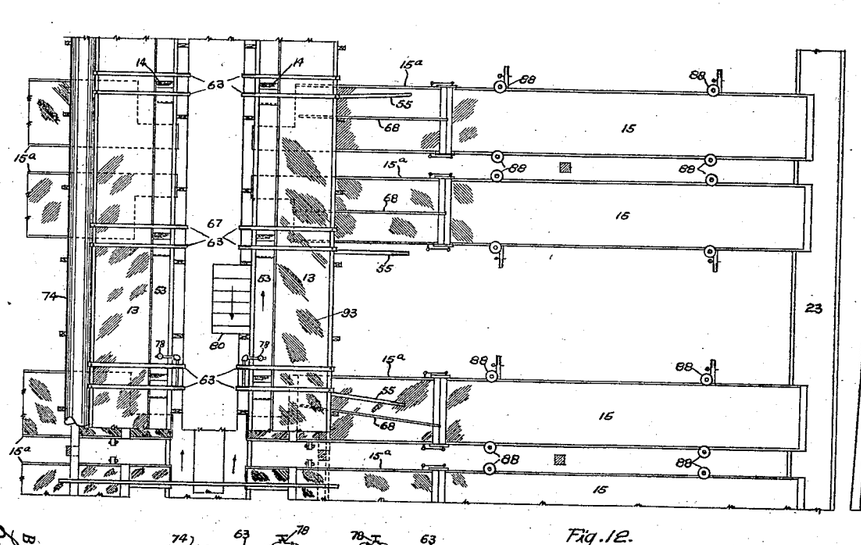
Figure 12, is a top plan view of a broken-away portion of the separator flumes and concentrating tables, the tables being arranged in pairs for convenience of operation.
Figure 13:
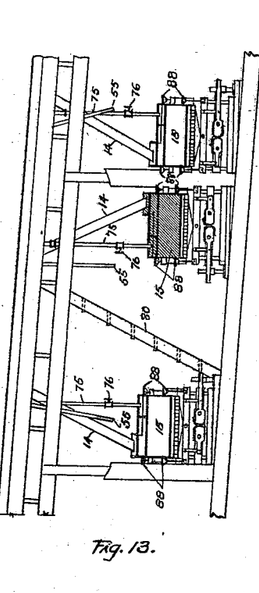
Figure 13, is a projected end view of Figure 12.
Figure 14:
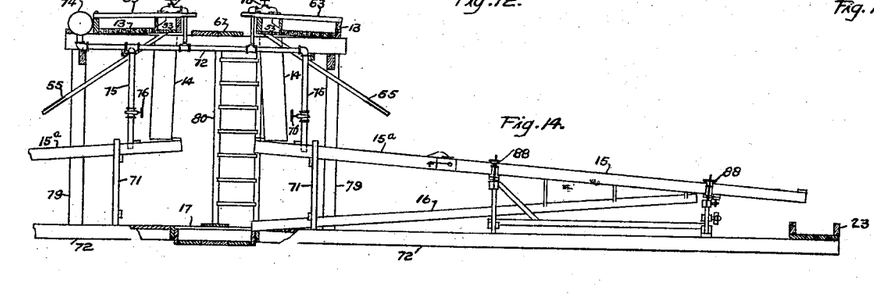
Figure 14, is a side elevation of Figure 12.
Figures 15, 16, 17:
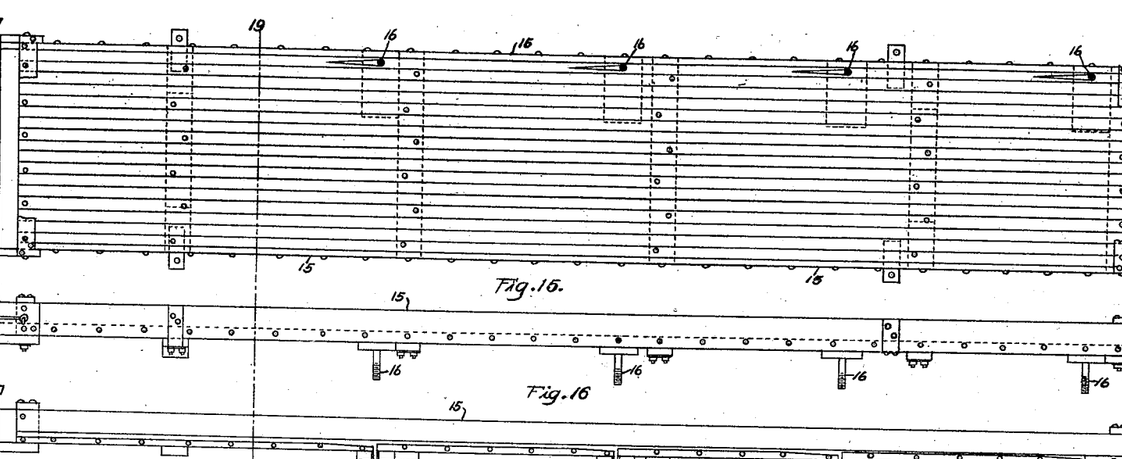
Figure 15, is a plan view of one of the concentrating tables with the baffles removed.
Figure 16, is a side elevation of the same.
Figure 17, is a longitudinal sectional view taken on the line 17—17 of Figure 15.
Figures 18, 19, 20, 21:
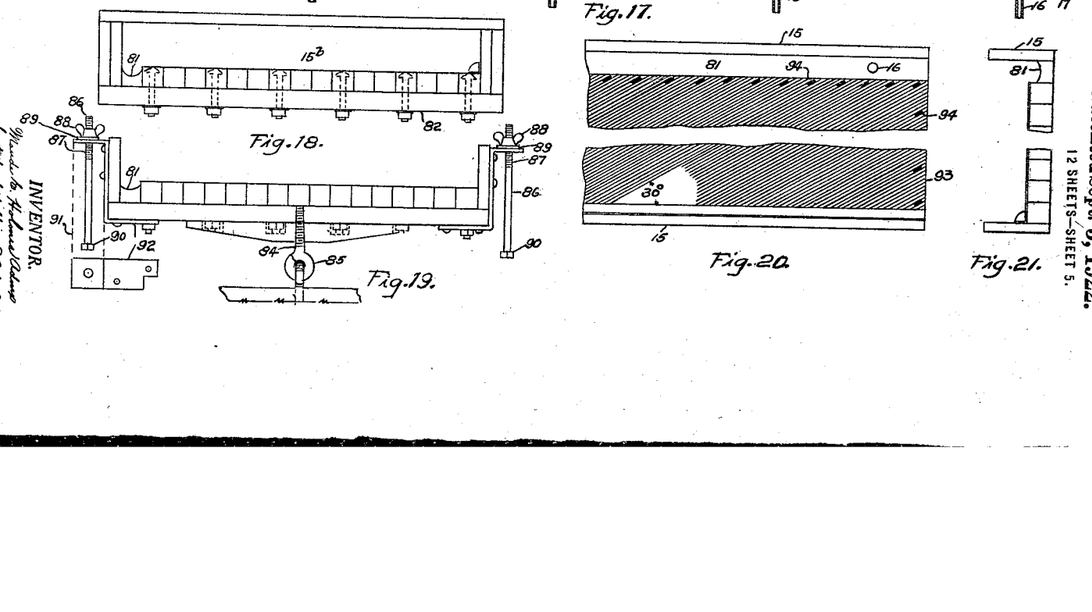
Figure 18, is an upper end view of Figure 15.
Figure 19 is a sectional view taken on the line 19—19 of Figures 15, 16 and 17.
Figure 20, is a broken-away plan view of one of the concentrator tables with the baffles attached and showing the manner of attaching the baffles.
Figure 21, is a projected end view of Figure 20.
Figure 22:
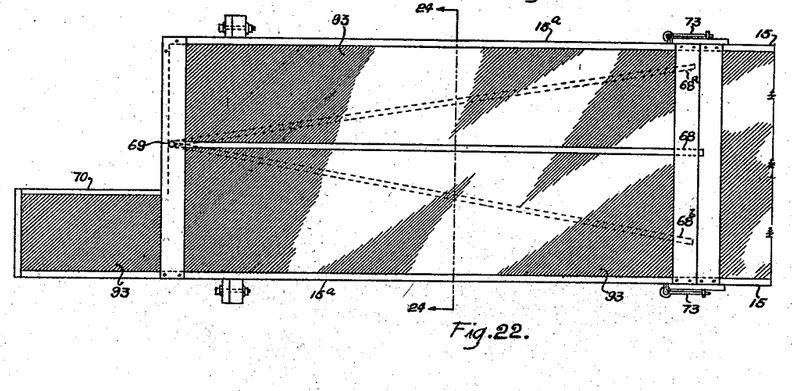
Figure 22, is a plan view of a table attached to the head of the concentrating tables and carrying an adjustable spreader and showing the manner of attachment to the concentrating tables.
Figure 23:
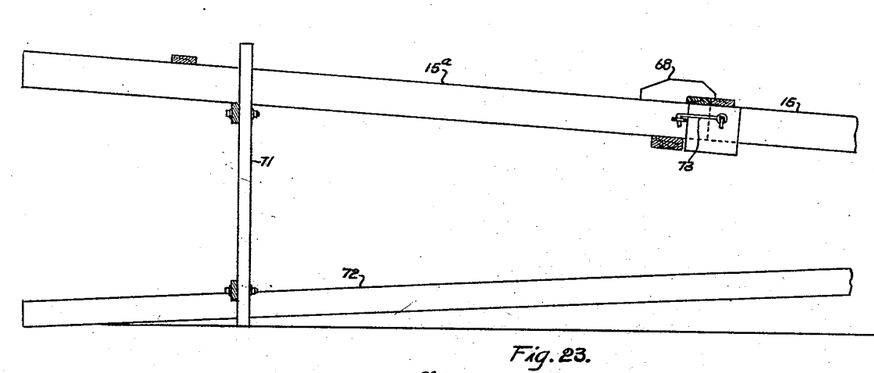
Figure 23, is a side view of the same.
Figure 24:
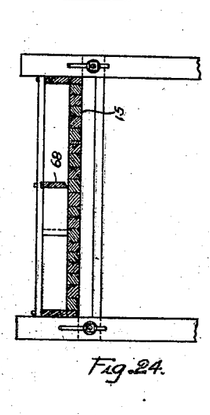
Figure 24, is a sectional view taken on the line 24—24 of Figure 22.

While diagrammatic view 1 shows only one separator flume 13, in practice we use them in pairs as shown in Figures 12, 13 and 14, with a passage-way and walk 67 so that tables 15 are arranged on each side. The concentrating tables 15 have one section $15^a$ into which the draw-offs 14 lead and which carry spreader boards 68. This section is illustrated in Figures 22, 23 and 24 in which the spreader board is shown pivoted as at 69 and showing in dotted lines $68^a$ and $68^b$ two additional positions on the concentrating table. A projection 70, the same being an addition to the table, is the recipient of the lower end of the draw-off 14. The angle of the section $15^a$ is adjusted by supports 71 supported by the frame 72. The section $15^a$ is attached to the table 15 by means of latches 73, one on each side thereof. An enclosed fresh water pipe 74 has branches 75 leading to the sections $15^a$ of the tables 15 with valves 76 in the branches. Branches 77 from the pipe 74 lead to the channels 53 of the flumes 13 and which have valves 78. The flumes 13, pipes 74, 75 and 77 and connecting mechanism are mounted on a frame 79. A ladder 80 leads to the passage-way and walks 67.

Referring now to Figures 15 to 21 inclusive, the same being concentrating tables, a channel 81 extends longitudinally of the same from which the draw-offs 16 extend. The table body $15^b$ is secured to transversely arranged girders 82 by means of bolts 83 with their heads countersunk as shown. These tables 15 are mounted on centrally disposed pivots as by eye-bolts 84 which have a racking engagement with stud bolts 85 permanently secured to the supporting frame. This is for the purpose of being able to adjust the tables sideways for leveling or tilting as may be required. This adjustment is effected by means of rods 86 threaded as at 87 with manually operative thumb-screws or wheels 88 mounted above a bearing 89 and secured to the sides of the tables 15. Heads 90 on the bottoms of the rods engaging in plates 91 permanently secured to the frame 92. Rubber riffles 93 set diagonally on the tops of the tables 15 and in the separator flume 13 are secured in that position as by staples 94. The same riffles 93 are used on the spreader section $15^a$ and on the extension 70 thereof. The same riffles are used on the floor of the separator flume 13. In the flumes 17 and 23 riffles 18 are installed (Figures 25 and 27) the same running transversely of the flumes. The riffles 93 used on the separator flume 13 and on the concentrating tables 15 are further shown in Figures 28, 29 and 30. The riffles 21 used on the final cleanup table 20 and which run transversely of the table are particularly shown in Figures 59, 60 and 61.

Figures 31, 32, 33:
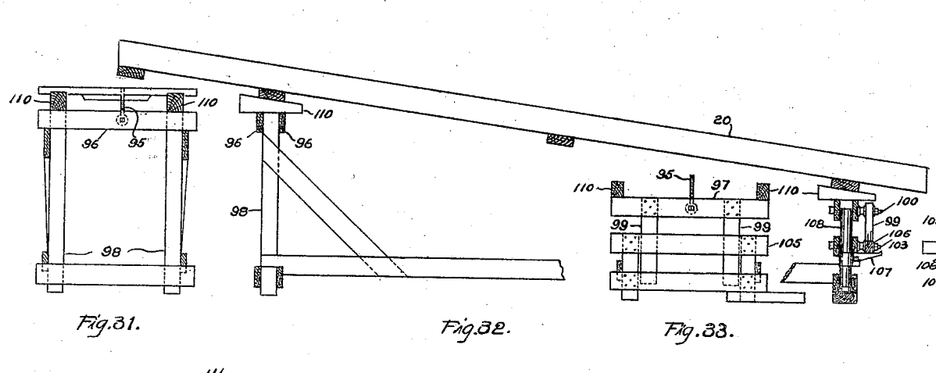
Figure 31, is an end view of a bolster supporting the head end of the final cleanup table for fine and flake gold.
Figure 32, is a side elevation of the table with some of the supporting mechanism broken-away.
Figure 33, is an end view of the bolster used to support the tail of the table.
Figure 34:
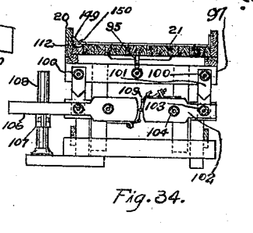
Figure 34, is an end view of the table and bolster showing means for adjusting the end of the table.

The general construction of the table 20 is shown in Figures 32, 33, 34 and 35, the same being mounted on centrally disposed pivots 95 supported by bolsters 96 and 97. The bolster 96 at the head of the table 20 is supported by a stationary frame 98. The bolster at the tail of the table 21 is vertically adjustable as shown in Figures 33 and 34. To the bolster 97 are rigidly secured vertically arranged guides 99. Pivoted to the bolster 97 as by bolts 100 are arms 101, the said arms being also pivoted to levers 102 as by bolts 103. The levers 102 are fulcrumed by means of bolts 104 to a horizontally arranged cross-beam 105. An outwardly extending arm 106 reaches from one of the levers 102 and is supported by a hand 107 vertically adjustable on an upright post 108. The levers 102 are joined together at their inner ends as by a chain 109. The levers 102 are manually operated by means of the arm 106, the raising or lowering of the same having the effect of lowering or raising the inner ends of both levers in unison and lowering or raising the table 20 accordingly. The table 20 is then leveled transversely by means of wedges 110 driven between the bolster and the table.

At the upper end of the table 20 riffles 111 are mounted longitudinally of the table and overlap the riffles 21. This has the effect of spreading the materials coming onto the table. Longitudinally arranged along one side of the table 20 is a channel 112.

Referring now to Figure 1, from point $10^b$ to point $10^c$ in the main flume 10 are installed $\frac{1}{16}$ inch grizzlies 113, shown in enlarged detail in Figures 51 and 52. From point $10^c$ to point $10^d$ in the main flume 10 are installed $\frac{1}{2}$ inch grizzlies 114, shown in enlarged detail in Figures 53 and 54. From point $10^d$ to $10^e$ in the main flume 10 are installed one inch grizzlies 115, shown in enlarged detail in Figures 55 and 56, and from point $10^e$ to point $10^f$ in the main flume 10 are installed three inch grizzlies 116, shown in enlarged detail in Figures 57 and 58. On the table 30 (Fig. 1) between the points $30^a$ and $30^b$ are installed Hungarian riffles 33 shown in enlarged detail in Figures 36, 37 and 38. From points $30^b$ to $30^c$ on the table 30 are installed gold riffles 118, shown in enlarged detail in Figures 39, 40 and 41. From the point 30$^c$ to 30$^d$ on the table 30 are installed gold riffles 119, shown in enlarged detail in Figures 42, 43 and 44. From the point 30$^d$ to 30$^e$ on the table 30 are installed ruby riffles 120, shown in enlarged detail in Figures 45, 46 and 47. From the point 30$^e$ to 30$^f$, on the table 30, are installed ruby riffles 121, shown in enlarged detail in Figures 48, 49 and 50.

In the practical operation of the separator which, as heretofore stated, is to separate coarse, fine and flour gold, platinum, large and small rubies and black sand carrying gold from gravel and sand by strictly a gravity process and which is done by the mechanism hereinbefore particularly described, the main flume 10 is set on an angle of 10 inches to 12 feet, the side flume 12 being on the same grade. The separator flume 13 is set on an angle of 8 inches to 12 feet. The flumes 17 and 23 are set on an angle of 2 inches to 1 foot. The table 20 is adjustable and used at an angle varying from approximately level to 2 inches to 1 foot. The portion 12$^a$ of the flume 12 connecting with the separator flume 13 is calculated for rapid conveyance, also the conveyer flume 22 leading from the separator flume 13 to the flume 23. The tables 30 and 32 are set on an angle of approximately 2 inches to 1 foot. These tables are adjustable so that the angle may be varied to meet the conditions and to get the desired results. A head of water and the material to be treated are turned into the head of the flume 10 (Figure 1), filling the space between the girders 45 (Figure 5) and over the grizzlies 113 to a depth of from two to three feet if desired. While passing over the $\frac{1}{16}$ grizzlies 113, the black sand, the fine gray sand and the fine gold pass downwardly through the grizzlies 113 to and through the spaces between the girders 45 to the draw-offs 11, from where the same reaches the flume 12, passes through the portion 12$^a$ to the distributor flume 13. The flume 13 has mounted therein rubber riffles 93 shown in enlarged view in Figure 28. By the aid of these riffles and the flow of the water about sixty per cent of the gray sand is washed out and passes through the flume 22 (Figure 1) to the flume 23. The remaining material is washed into the channel 53 (Figures 6 and 8) and there distributed through the draw-offs 14 to the concentrating tables 15 which may be provided in great number, and which are provided with the diagonally set rubber riffles 93 shown in Figure 28. These riffles with the aid of the flow of water causes the black sand and fine gold to gather in the riffles and as the same accumulates to work downwardly along the riffles to the longitudinal channel 81 (Figures 15 to 21 inclusive) from where the same is drawn off through the openings 16 to the flume 17 (Figure 1). The gray sand that has not been separated by the flume 13 is mainly carried over the end 15$^a$ (Figure 1) of the tables 15 to the flume 23. In the flume 17 the riffles 18 extract and retain the fine gold, and the black sand carrying values is washed over the same to the bin 26 where the same is in condition to be transported to a smelter for treatment. The gold that remains in the gray sand that goes over the ends 15$^a$ of the tables 15 into the flume 23 is gathered by the riffles 18 in said flume. The gray sand in the flume 23 is carried off by a side flume 27 (Figure 1) leading to the tail 10$^c$ of the main flume 10. Fresh water from a pipe 74 is constantly running into the tables 15 through the connections 75, (Figures 12, 13 and 14), which aids in the separation process. The gold that has been gathered by the riffles 18 in the flume 17 is washed by a supply of clean water in a cleaning up process through a draw-off 19 to the table 20 where the riffles 21 gather the same and the same is washed clean by the said supply of clean water for the mint. The gold gathered by the riffles 18 in the flume 23 is washed therein by a supply of clear water. This section of the flume is tiltably adjustable so that the gold is washed to one side of the flume and there manually gathered. As the material to be treated is fed onto the tables 15, the spreader boards 68 are adjusted to control the spread of the feed. Referring now to Figures 1 and 53 to 56 inclusive, the $\frac{1}{2}$ inch grizzlies 114 and one inch grizzlies 115 extract from the material in the main flume 10, the coarser gold, rubies and platinum, the same passing through the draw-offs 28 to the conveyer flume 29 to the table 30 where the retaining riffles 33 hold the coarse gold, rubies and platinum of such dimensions that the same did not pass through the $\frac{1}{16}$ inch grizzly. These values are retained by the riffles 33 until such time as it is desired to make a clean-up of the same when the flow of material and water is turned off from the same and clear water supply turned onto the table 30 which will have the following effect. The riffles 118 (Figures 1 and 39 to 41 inclusive) will retain the coarser gold and rubies, the finer particles passing on to riffles 119 (Figures 42, 43 and 44) where they are held, the rubies passing over both sets of these riffles to riffles 120 and 121 (Figures 45 to 50 inclusive) where the larger rubies are retained by the larger riffles 120 and the smaller ones by the smaller riffles 121. Along one side of all of these riffles is a channel 122 into which all the values are washed for gathering off.

The 3 inch grizzlies 116 take up larger pieces of rock and the like carrying sufficient quantities of valuable mineral to cause the same to pass therethrough by gravity, the same passing through the draw-off 31 to the table 37 where the retaining riffles 33 (Figures 1 and 36 to 38 inclusive) take up the same. The launder flumes 34, 35 and 36 carry the waste and water into the end 10ª of the main flume 10, where the same is discarded.

In actual practice we duplicate the tables in flumes 13, 17 and 23, also duplicate the tables 30 and 32, and provide for turning the material from one set to the other so as to have a continuous treating process going on all of the time. While one set of tables is being cleaned up another set is gathering values.

Referring to Figures 6 to 11 inclusive and to Figures 12 to 14 inclusive, the gates 54 are regulated by means of levers 55 manually operated to govern the width of the space for the outflow through the drawoffs 14. The over-lapping plates 60 prevent materials from washing in back of the gates 54.

Referring to Figure 60, a wedge 149 extends longitudinally along the channel 112 and the riffle matting 21 is extended upwardly over the same as at 160. This prevents the concentrates from getting into the channel 112 until cleanup time, when the wedge 149 is removed, which causes the extension 160 to drop downwardly and into the channel 112 so that the concentrates can be washed into the channel 112.

What is claimed is:—

1. A gravity concentrator comprising a main flume, grizzlies at spaced intervals in the flume and spaced above the floor thereof, a conveyor flume, drawoffs leading from the bottom of the main flume beneath the grizzlies respectively, and connected with the conveyor flume, a distributor flume carrying baffles connected to said conveyor flume, drawoffs leading from said distributor flume and concentrating tables connected with said last mentioned drawoffs carrying riffles for retaining black sand and having an overflow for waste materials.

2. A gravity concentrator comprising a main flume, grizzlies at spaced intervals in the flume and spaced above the floor thereof, a conveyor flume, drawoffs leading from the bottom of the main flume beneath the grizzlies respectively and connected with the conveyor flume, a distributor flume at the end of the conveyor flume having riffles and a longitudinally arranged channel along one side thereof, a fresh water conduit leading thereto, concentrating tables, drawoffs leading from said channel to said concentrating tables, a fresh water conduit leading to said concentrator tables, said concentrator tables having riffles for retaining black sand and an overflow for waste materials.

3. A gravity concentrator comprising a main flume, grizzlies at spaced intervals in the flume and spaced above the floor thereof, a conveyor flume, drawoffs leading from the bottom of the main flume beneath the grizzlies respectively and connected with the conveyor flume, a distributor flume connected with the conveyor flume and carrying riffles and having a longitudinally arranged channel along one side thereof, a fresh water conduit leading thereto, concentrating tables, drawoffs leading from said channel to said concentrating tables, a fresh water conduit leading to said concentrator tables, said concentrator tables having riffles for retaining black sand and an overflow for waste materials, drawoffs leading from said concentrating tables to a receiving table having riffles and a longitudinal channel along one side thereof.

4. A gravity concentrator comprising a main flume, grizzlies at spaced intervals in the flume and spaced above the floor thereof, a conveyor flume, drawoffs leading from the bottom of the main flume beneath the grizzlies respectively and connected with the conveyor flume, a distributor flume carrying riffles and having a longitudinally arranged channel along one side thereof, a fresh water conduit leading thereto, concentrating table, drawoffs leading from said channel to the concentrating tables, a fresh water conduit leading to said concentrating tables, said concentrating tables carrying riffles for retaining black sand and having an overflow for waste materials, drawoffs leading from said concentrating tables to a receiving table having riffles and a longitudinally arranged channel at one side thereof, and a bin at the lower end of said receiving table.

5. A gravity concentrator comprising a main flume, grizzlies at spaced intervals in the flume and spaced above the floor thereof, a conveyor flume, drawoffs leading from the bottom of the main flume and beneath the grizzlies respectively and connected with the conveyor flume, a distributor flume carrying riffles and having a longitudinally arranged channel along one side thereof, a fresh water conduit leading thereto, concentrating tables, drawoffs leading from said channel to the concentrating tables, a fresh water conduit leading to said concentrating tables, said concentrating tables carrying riffles for retaining black sand and having an overflow for waste materials, drawoffs leading from said concentrating tables to a receiving table having riffles and a longitudinally arranged channel along one side thereof, a final clean up table having riffles and a drawoff leading from said last named table and a bin at the lower end of said table.

6. A gravity concentrator comprising a main flume, grizzlies at spaced intervals in the flume and spaced above the floor thereof, a conveyor flume, drawoffs leading from the bottom of the main flume beneath the grizzlies respectively and connected with the conveyor flume, a distributor flume having riffles and a longitudinally arranged channel along one side thereof, a fresh water conduit leading thereto, concentrating tables, drawoffs leading from said channel to said concentrating tables, a fresh water conduit leading to said concentrating tables, said concentrating tables carrying riffles for retaining black sand and having an overflow for waste materials, a conveyor flume leading from said distributor flume and a conveyor flume leading from the concentrating table joined together and connected with a receiving table having riffles and a bin at the lower end of the table.

7. A gravity concentrator comprising a main flume, grizzlies at spaced intervals in the flume and spaced above the floor thereof, a conveyor flume and drawoffs leading from near the entrance of the main flume beneath the grizzlies respectively for drawing off sand and fine gold from the main flume, and concentrating tables connected with the conveyor flume drawoffs leading from the bottom of the main flume beneath the grizzlies respectively and beyond the first mentioned drawoffs for separating out coarse gold and rubies, a receiving table connected therewith having riffles of different sizes at different places on said table adapted for retaining at different places on said table coarse and fine gold and large and small rubies.

8. A gravity concentrator comprising a main flume, conveyor flume, concentrating tables and separators, drawoffs leading from the bottom of the main flume near the upper portion thereof and connected with the said conveyor flume, concentrating tables and separators, and conduits leading from said concentrating tables and separators back to the main flume at the lower portion thereof, for carrying waste materials thereto.

9. A gravity concentrator comprising a main flume, grizzlies at spaced intervals in the flume and spaced above the floor thereof, drawoffs leading from the bottom of the flume beneath the grizzlies respectively, a table having sets of riffles at different places on said table adapted for separately retaining at different places on said table coarse and fine gold and large and small rubies, connected with said main flume by a conveyor flume into which said drawoffs lead; and a table, having riffles adapted for retaining extremely large gold particles, said table being connected with said main flume by a conveyor flume into which said drawoffs lead, and a conveyor flume at the lower end of each of the two last named tables connected with the lower end of the main flume for returning waste materials thereto.

10. A gravity concentrator comprising a main flume, grizzlies at spaced intervals in the flume and spaced above the floor thereof, drawoffs leading from the bottom of the flume beneath the grizzlies respectively and connected with a conveyor flume leading to a distributing flume, carrying riffles and having a longitudinally arranged channel along one side thereof a fresh water conduit leading thereto, drawoffs leading from said channel to concentrating tables, a fresh water conduit leading to said concentrator tables, said concentrator tables carrying riffles for retaining black sand and having an overflow for waste materials, a conveyor flume leading from the distributor flume and a conveyor flume leading from the concentrating table joined together and connected with a table having riffles, a bin at the lower end of the table, and a conveyor flume leading from said last named table and connected with the lower end of the main flume for returning waste materials thereto.

In testimony whereof, I affix my signature in the presence of two witnesses.

MAUDE E. HOLMES.

*Administratrix of the estate of William P. Ogden, deceased.*

Witnesses:
    MONICA B. THOMPSON,
    S. A. DEARDOFF.